United States Patent [19]

Streeter et al.

[11] Patent Number: 5,855,035
[45] Date of Patent: Jan. 5, 1999

[54] METHOD AND APPARATUS FOR REDUCING SKIDDING OF WHEELS ON A PASSENGER BOARDING BRIDGE

[75] Inventors: Raymond K. Streeter; Dana W. Gross, both of Tarrant, Tex.

[73] Assignee: Thyssen Stearns, Inc., Kassel, Germany

[21] Appl. No.: 775,439

[22] Filed: Dec. 30, 1996

[51] Int. Cl.⁶ ........................................... E01D 1/00
[52] U.S. Cl. ......................... 14/71.5; 14/72.5; 180/411
[58] Field of Search ................... 14/71.5, 72.5; 180/264, 267, 411

[56] References Cited

U.S. PATENT DOCUMENTS

| | | | |
|---|---|---|---|
| 2,581,293 | 1/1952 | Read et al. | 14/72 |
| 2,688,761 | 9/1954 | Good et al. | 14/71 |
| 2,700,169 | 1/1955 | Henion | 14/72 |
| 2,824,749 | 2/1958 | Yasuda | 180/411 X |
| 2,875,457 | 3/1959 | Read et al. | 14/71 |
| 3,038,185 | 6/1962 | Moore | 14/71 |
| 3,046,908 | 7/1962 | Yuen | 104/20 |
| 3,047,891 | 8/1962 | Golde et al. | 14/71 |
| 3,060,471 | 10/1962 | Yuen et al. | 14/71 |
| 3,086,152 | 4/1963 | Lodjic et al. | 318/32 |
| 3,099,847 | 8/1963 | Lodjic et al. | 14/71 |
| 3,110,048 | 11/1963 | Bolton | 14/71 |
| 3,121,243 | 2/1964 | Phillips | 14/71 |
| 3,123,167 | 3/1964 | Lichti | 180/6.5 |
| 3,184,772 | 5/1965 | Moore et al. | 14/71 |
| 3,235,283 | 2/1966 | Voghel | 180/411 X |
| 3,263,253 | 8/1966 | Wollard et al. | 14/71 |
| 3,263,254 | 8/1966 | Wollard et al. | 14/71 |
| 3,310,823 | 3/1967 | Preiss | 14/71 |
| 3,315,291 | 4/1967 | Wollard et al. | 14/71 |
| 3,317,942 | 5/1967 | Wollard et al. | 14/71 |
| 3,341,875 | 9/1967 | Wollard et al. | 14/71 |
| 3,369,264 | 2/1968 | Kurka et al. | 14/71 |
| 3,377,638 | 4/1968 | Seipos | 14/71 |
| 3,378,868 | 4/1968 | Wollard et al. | 14/71 |
| 3,391,416 | 7/1968 | Riggles, Jr. | 14/71 |
| 3,402,412 | 9/1968 | Seipos | 14/71 |
| 3,404,417 | 10/1968 | Wollard et al. | 14/71 |
| 3,412,412 | 11/1968 | Kjerulf et al. | 14/71 |
| 3,422,477 | 1/1969 | Riggles, Jr. | 14/71 |
| 3,462,784 | 8/1969 | Seipos | 14/71 |
| 3,462,787 | 8/1969 | Seipos | 14/71 |

(List continued on next page.)

OTHER PUBLICATIONS

Airline Industrial Machinery, Inc., Tampa, Florida—5 pages of drawings. Date of facsimile transmission Aug. 24, 1995. (drawings undated).

"Designing a Better Steering System", Daniel D. Fritzinger, Machine Design, Sep. 26, 1996 (pp. 118 & 120).

U.S. Patent Application No. 08/666,841 filed Jun. 19, 1996, and entitled "Method and Apparatus for Variably Elevating a Passenger Boarding Platform".

U.S. Patent Application No. 08/677,934, filed Jul. 10, 1996, and entitled "Method and Apparatus for Connecting a Passenger Boarding Bridge to a Moveable Body".

*Primary Examiner*—James Lisehora
*Attorney, Agent, or Firm*—Baker & Botts, L.L.P.

[57] ABSTRACT

A method and apparatus for reducing skidding of wheels on a passenger boarding bridge is provided. The method includes the steps of receiving a travel direction (505), providing a skid compensation control signal (506) to an actuator (728) in response to the travel direction, and aligning by the actuator the wheel (214, 216) in response to the skid compensation control signal. A passenger boarding bridge (110) is provided that includes an extensible tunnel (114) with a fixed end (124) and a free end (116). A plurality of wheels (204, 206, 214, 216) are placed on the free end for moving the free end of the tunnel in a desired direction. The bridge includes a steering mechanism (502) for controlling the direction of movement of the free end and a control system (500) for aligning at least one of the wheels to reduce skidding. The control system includes a computing device (504) for generating a control signal and an actuator for rotating at least one of the wheels in response to the control signal.

20 Claims, 2 Drawing Sheets

U.S. PATENT DOCUMENTS

| | | | |
|---|---|---|---|
| 3,532,178 | 10/1970 | Lindbom | 180/411 |
| 3,543,318 | 12/1970 | Tushim | 14/71 |
| 3,561,030 | 2/1971 | Seipos | 14/71 |
| 3,599,262 | 8/1971 | Carder et al. | 14/71 |
| 3,665,536 | 5/1972 | Jackson | 14/71 |
| 3,694,724 | 9/1972 | Eggert, Jr. | 318/648 |
| 3,696,881 | 10/1972 | Gordon | 180/411 |
| 3,875,603 | 4/1975 | Mampaey | 14/71 |
| 4,161,049 | 7/1979 | Saunders et al. | 14/71.5 |
| 4,222,140 | 9/1980 | Olewinski et al. | 14/71.3 |
| 4,263,979 | 4/1981 | Sturgill | 180/411 |
| 4,318,198 | 3/1982 | Drozd | 14/71.5 |
| 4,333,194 | 6/1982 | Drozd | 14/71.5 |
| 4,366,591 | 1/1983 | Zimmerman | 14/71.3 |
| 4,369,538 | 1/1983 | Smedal | 14/69.5 |
| 4,473,916 | 10/1984 | Connold | 14/42 |
| 4,559,660 | 12/1985 | Lichti | 14/71.5 |
| 4,852,197 | 8/1989 | Thomas, Jr. | 14/71.5 |
| 4,984,321 | 1/1991 | Larson | 14/71.5 |
| 5,004,188 | 4/1991 | Donneky et al. | 244/137.002 |
| 5,084,936 | 2/1992 | Thomas, Jr. | 14/71.5 |
| 5,105,495 | 4/1992 | Larson et al. | 14/71.5 |
| 5,226,204 | 7/1993 | Schoenberger et al. | 14/71.5 |
| 5,257,431 | 11/1993 | Larson et al. | 14/71.5 |
| 5,267,368 | 12/1993 | Saunders | 14/71.5 |
| 5,328,252 | 7/1994 | Thompson | 301/64.4 |
| 5,359,746 | 11/1994 | Kane et al. | 14/711 |

METHOD AND APPARATUS FOR REDUCING SKIDDING OF WHEELS ON A PASSENGER BOARDING BRIDGE

TECHNICAL FIELD OF THE INVENTION

This invention relates generally to the field of passenger boarding bridges and more particularly to a method and apparatus for reducing skidding of wheels on a passenger boarding bridge.

BACKGROUND OF THE INVENTION

Passenger boarding bridges have numerous applications such as connecting an airplane to an airport terminal or a ship to a dock. One type of passenger boarding bridge is an extensible bridge, which has a variable length to accommodate varying distances between passenger departure points and the ship or airplane. Some extensible bridges have a fixed end and a free end. In those types of bridges, the bridge may be rotated about the fixed end while the bridge is maintained at a constant length. In such a case, the free end travels along a circular path. In addition, the bridge may also extend at the free end while rotating, thus providing a non-circular path of travel for the free end. Rotation and extension enables the free end to be positioned at a desired point along the dock or airport terminal. Both rotating and extending are generally accomplished through steering two sets of drive wheels positioned on the free end. To stabilize the bridge, the two sets of wheels are often separated by a large distance, but are nevertheless each steered in the same direction based the direction of travel of the free end. These wheels often skid during rotation and extension causing wear of the wheels and damage to the bridge.

This problem of skidding has been previously addressed in bridges that do not extend in length, which are sometimes called radial bridges. In radial bridges, the free end of the bridge swings in a fixed arc. Skidding of the wheels is reduced through separately aligning each set of wheels in a predetermined and fixed direction. However, this method of preventing skidding does not address skidding of wheels in a bridge that may extend as well as rotate. Therefore, a need has arisen for a new method and apparatus that overcomes the disadvantages and deficiencies of the prior art.

SUMMARY OF THE INVENTION

A method for reducing skidding of a passenger boarding bridge wheel is disclosed. The method includes the steps of receiving a travel direction, providing a skid compensation control signal to an actuator in response to the travel direction, and aligning by the actuator the wheel in response to the skid compensation control signal.

In another embodiment, a method for reducing skidding in a passenger boarding bridge having at least two wheels is disclosed. The method includes aligning a first wheel to a desired first angular position and providing the first angular position to a computing device. The computing device generates a skid compensation control signal in response to the first angular position. In response to the skid compensation control signal, a second wheel is rotated to a second angular position.

In another embodiment, a passenger boarding bridge is disclosed. The passenger boarding bridge includes an extensible tunnel with fixed end and free ends. A plurality of wheels are placed on the free end for moving the free end of the tunnel in a desired direction. The bridge includes a steering mechanism for controlling the direction of movement of the free end and a control system for aligning at least one of the wheels to reduce skidding. The control system includes a computing device for generating a control signal and an actuator for rotating at least one of the wheels in response to the control signal.

A technical advantage of the present invention is that a method for reducing the skidding of wheels on a passenger boarding bridge is provided. Another technical advantage is that the method reduces wear and tear on the wheels and the bridge. Another technical advantage is that a passenger boarding bridge constructed according to the teachings of the present invention has a longer life due to reduced wear because skidding of its wheels is controlled. Another technical advantage of the present invention is that it provides an electronic and programmable method and apparatus for reducing the skidding of wheels on a passenger boarding bridge that works under varying conditions such as differing extensions of the bridge. This contrasts with mechanical means used to prevent skidding in radial bridges, which are optimal for only one bridge length.

BRIEF DESCRIPTION OF THE DRAWINGS

For a more complete understanding of the present invention and advantages thereof, reference is now made to the following descriptions taken in connection with the accompanying drawings in which.

DETAILED DESCRIPTION OF THE INVENTION

The preferred embodiment of the present invention and its advantages are best understood by referring to FIGS. 1 through 5 of the drawings, like numerals being used for like and corresponding parts of the various drawings.

Figure 1:
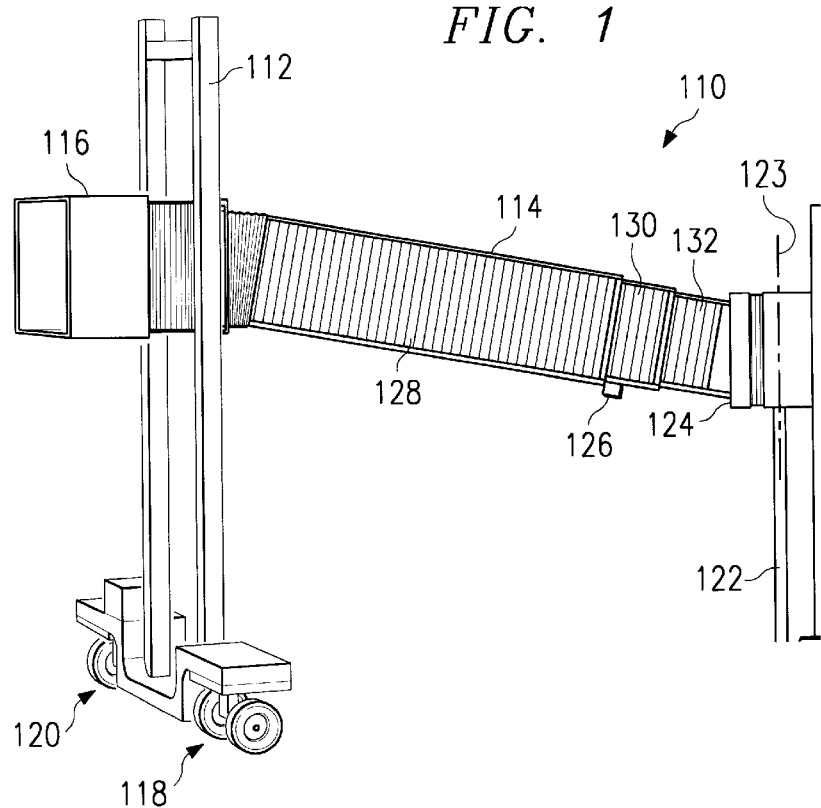
FIG. 1 shows an extensible passenger boarding using a control system according to the teachings of the present invention.

In FIG. 1, an extensible passenger boarding bridge 110 is shown. The bridge includes an extendible lift column 112. Extendible lift column 112 may consist of two parallel steel structures, supporting an extensible tunnel 114. Extensible tunnel 114 may include multiple nested tunnels, as illustrated in FIG. 1. In FIG. 1, tunnel 114 include outer tunnel 128, middle tunnel 130, and inner tunnel 132. Extension sensor 126 measures the extension of extensible tunnel 114 and may be placed at any desired location to measure the extension of tunnel 114. In the embodiment illustrated in FIG. 1, extension sensor 126 is placed at the intersection of outer tunnel 128 and middle tunnel 130. The operation of extension sensor 126 is discussed in greater detail below in conjunction with FIG. 5. At one end of extensible tunnel 114 is a cab section 116 from which passengers depart the tunnel to board a ship or plane. At the bottom of extendible lift column 112 are two sets of wheels 118 and 120. The sets of wheels 118 and 120 function to position cab 116 at a desired location so that passengers may depart tunnel 114 and board a ship or plane (not shown). Also supporting tunnel 114 at tunnel fixed end 124 is a support 122, which is fixed in position and does not translate. Tunnel 114 may pivot about pivot axis 123 and may pivot in the horizontal plane about fixed end 124.

Figure 2A:
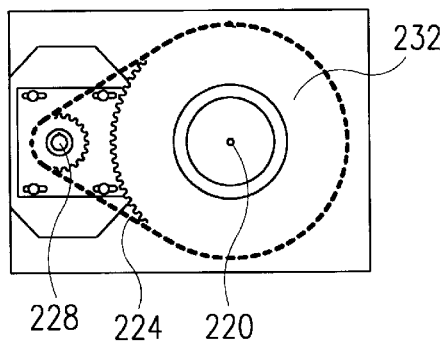
FIGS. 2 and 2A illustrate two sets of wheels supporting the passenger boarding bridge illustrated in FIG. 1.
Figure 2:
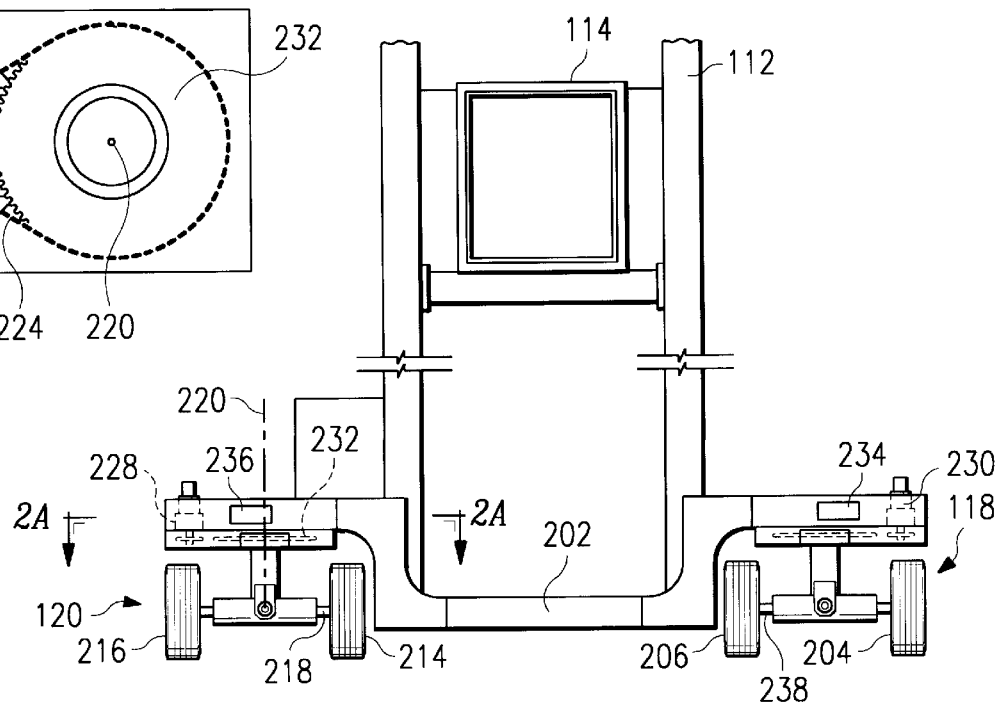

Referring now to FIG. 2, an enlarged end view of wheel sets 118 and 120 is shown. Wheel sets 118 and 120, which in the embodiment shown in FIG. 2 are substantially identical, are connected by a support base 202. Support base 202 also supports extendible lift column 112. Wheel set 120 contains two wheels 214 and 216 connected by a common axis 218. Common axis 218 and therefore wheels 214 and 216 may pivot about axis 220 in order to adjust the alignment of wheels 214 and 216. Similarly, wheels 204 and 206 are connected by a common axis 238. Wheels 214 and 216 pivot about axis 220 through rotation of motor 228. As illustrated in FIG. 2A, motor 228 drives chain 224. Chain 224 drives gear 232 thereby pivoting wheels 214 and 216 about axis 218. Wheels 204 and 206 are aligned in a similar manner by motor 230. In this manner, wheel sets 120 and 118 may be steered through independent actuation of motors 228 and 230. Wheel rotation sensors 234 and 236 measure the alignment of wheel sets 118 and 120, respectively, and is discussed in greater detail in conjunction with FIG. 5. Wheel rotation sensors 234 and 236 may be placed on support base 202 or other suitable location that allows measurement of the alignment of wheel sets 118 and 120.

Figure 3:
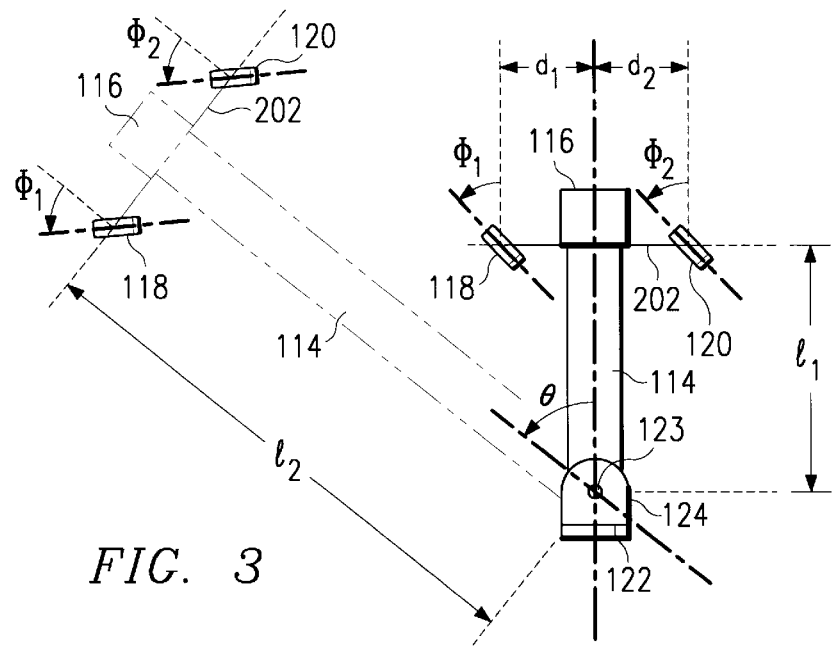
FIG. 3 shows a top view of a passenger boarding bridge before and after rotation and extension.

Referring now to FIG. 3, the operation of the steering of passenger boarding bridge 110 is described. FIG. 3 shows a top view of a schematic of passenger boarding bridge 110 in an initial retracted position and after extension and rotation through an angle θ. As shown in FIG. 3, tunnel 114 rotates about pivot axis 123 at fixed end 124. Axis 123 is coaxial with support 122. In its initial position, the length of the tunnel, measured from pivot axis 123 to support base 202 is $l_1$. After rotation, the length of tunnel 114, measured from the pivot axis 123 to support base 202 is $l_2$. The distance of wheel set 118 measured from the centerline of tunnel 114 to the center of wheel set 118 is $d_1$ and the distance of wheel set 120 measured from the centerline of tunnel 114 to the center of wheel set 120 is $d_2$. In one embodiment of the invention, distances $d_1$ and $d_2$ are equal; however, these distances may differ without departing from the scope of the present invention. Cab 116 of passenger boarding bridge 110 may be placed at desired locations for passenger departure or arrival through steering of wheel sets 118 and 120.

As shown in FIG. 3, $\phi_1$ is the angle of wheel set 118 measured from the longitudinal axis of tunnel 114. For the purposes of this patent, angles $\phi_1$ and $\phi_2$ are defined as positive for both clockwise rotation of tunnel 114 and counterclockwise rotation of tunnel 114. As shown in FIG. 3, $\phi_1$ is approximately 45° and causes counterclockwise rotation of tunnel 114 . Similarly, angle $\phi_2$ locates the alignment of wheel set 120 with respect to the support base 202.

Cab 116 may be located at a desired location for passenger departure through extension or retraction of tunnel 114 and through pivoting of tunnel 114 about support 122 at pivot axis 123. One method of extending tunnel 114 is driving wheel sets 118 and 120 in a direction parallel to the tunnel 114. Such a case would correspond to $\phi_1$ and $\phi_2$ equal to 0°. As wheel sets 118 and 120 translate, cab 116 moves with the wheel sets 118 and 120, and tunnel 114 extends to provide a link between fixed end 124 and cab 116. The fixed end 124 is held in place at support 122. Thus, tunnel 114 is extended or retracted through translation of wheel sets 118 and 120 and by constraining the fixed end 124 at support 122.

Cab 116 may also be located at a given point through rotation of tunnel 114 about support 122 at pivot point 123. Tunnel 114 is also shown in FIG. 3 as rotated through an angular distance θ from its initial position. Rotation is accomplished through translation of wheel sets 118 and 120 at non-zero angles of $\phi_1$ and $\phi_2$. As wheel sets 118 and 120 translate, tunnel 114 pivots about support 122 at pivot axis 123, and in addition, tunnel 114 extends or retracts. In this manner cab 116 can be placed at a desired location.

Because wheel sets 118 and 120 are on a support base 202, which is rigid, and because the support base 202 is attached to tunnel 114, which is constrained at point 122, the paths that wheel sets 118 and 120 take in moving from a first position to a second position cannot be independently prescribed. In this context, "path" refers to an imaginary curve or line that tracks the position of a wheel set during rotation or extension of tunnel 114. "Path" contrasts with "alignment," which refers to the instantaneous direction a wheel set is pointed. "Alignment" is quantified by $\phi_1$ and $\phi_2$ for wheel sets 118 and 120, respectively. The path of only one wheel set, such as wheel set 118, can be prescribed by the operator, leaving wheel set 120 to follow a predetermined path based on the geometry of the passenger boarding bridge 110. Thus, if wheel set 118 is steered in a given direction, wheel set 120 must follow a path dependent upon the path of wheel set 118, which is dependent upon the extension of the tunnel 114 and the alignment of wheel set 118.

In the case of $\phi_1 = \phi_2 = 0°$, wheel set 118 is steered in a direction parallel to the longitudinal axis of tunnel 114 (i.e., straight ahead) and wheel set 120 travels in a direction parallel to the path of wheel set 118. Thus, when the tunnel 114 is steered straight ahead, wheel sets 118 and 120 are always aligned in directions parallel to each other. However, for cases in which $\phi_1$ and $\phi_2$ are not equal to 0° (i.e., the tunnel is rotating) the concurrence of the alignment of wheel set 120 with an instantaneous tangent drawn to the path of wheel set 120 is not possible if $\phi_1$ is equal to $\phi_2$. Thus, when tunnel 114 rotates, $\phi_2$ will not be aligned with the path set by the steering of wheel set 118. This misaligned of the path of wheel set 120 and the direction wheel set 120 is steered causes skidding of wheel set 120. The extent of the skidding increases as the distances between wheel sets 118 and 120 increase.

The present invention reduces skidding of wheels on wheel set 120 by aligning wheel set 120 in a different direction than wheel set 118. This alignment is accomplished by setting $\phi_2$ equal to a skid compensation angle that is not necessarily equal to $\phi_1$. The skid compensation angle is an angle a wheel set, such as wheel set 120, should be aligned to reduce skidding of the wheel set. In one embodiment of the present invention, the skid compensation angle is such that it aligns wheel set 120 in a direction approximately tangent to the path of wheel set 120, thereby, reducing skidding of wheel set 120.

Figure 4:
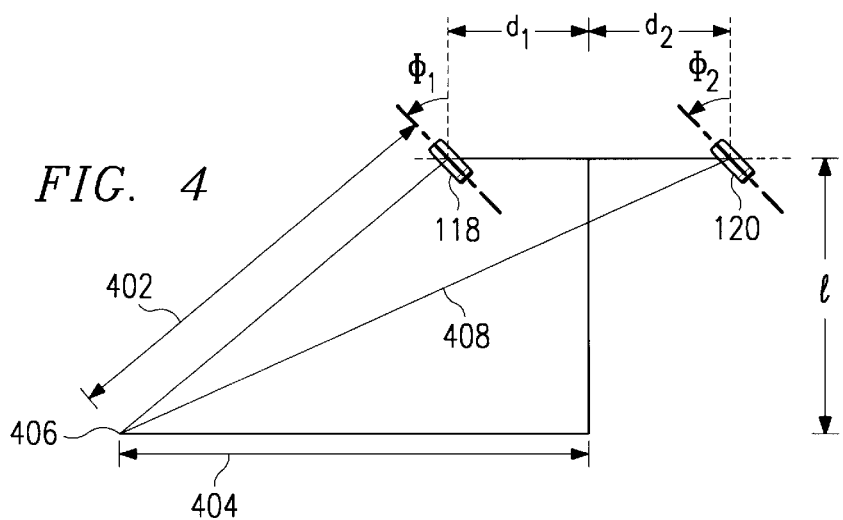
FIG. 4 shows a top view of the passenger boarding bridge shown in FIG. 3 and also illustrates dimensions used in the calculation of a skid compensation angle.

With reference to FIG. 4, the following skid compensation formula prescribes an exemplary relationship between $\phi_1$ and $\phi_2$ that aligns wheel set 120 in a direction approximately tangent to the instantaneous path of wheel set 120 for one embodiment of the invention and quantifies one set of possible values for the skid compensation angle. It should be understood that other relationships between $\phi_1$ and $\phi_2$ may quantify values for a skid compensation angle without departing from the scope of the invention. The following skid compensation formula utilizes a lag angle $\phi_3$, which is an angle by which $\phi_2$ lags $\phi_1$ for counterclockwise rotation of tunnel 114. For clockwise rotation of tunnel 114, lag angle $\phi_3$ is the angle by which $\phi_2$ leads $\phi_1$.

$$\phi_3 = \phi_1 - \tan^{-1}\left[\frac{l}{l\frac{\cos\phi_1}{\sin\phi_1} + (d_1 + d_2)}\right]$$

$\phi_2 = \phi_1 - \phi_3$ (For counterclockwise rotation of tunnel 114)

$\phi_2 = \phi_1 + \phi_3$ (For clockwise rotation of tunnel 14)

The above skid compensation formula describing a relationship between $\phi_1$ and $\phi_2$ is a fiction of the distances $d_1$ and $d_2$ of wheel sets 118 and 120 from the longitudinal axis of the tunnel 114 and the extended length of the tunnel 114. This formula is based upon the relationships between the alignment of wheel set 118 and wheel set 120 illustrated in FIG. 4. FIG. 4 illustrates a top view of the passenger boarding bridge shown in FIG. 3 and additionally illustrates dimensions used in the calculation of a skid compensation angle according to the skid compensation formula. In FIG. 4, a line 402 perpendicular to the instantaneous path of wheel set 118 is drawn that intersects line 404 at point 406. Line 404 is an imaginary line perpendicular to tunnel 114. A second line 408 connecting wheel set 120 to point 406 is drawn. Wheel set 120 is aligned in a direction perpendicular to line 408, prescribing angle $\phi_2$. Thus, at any instant in time, wheel set 118 and wheel set 120 are aligned such that lines 402 and 408 intersect at a common point on line 404.

The relationship between $\phi_1$ and $\phi_3$ is affected by the length of the tunnel 114 and therefore the level of extension of the tunnel 114. The following tables illustrates the relationship between $\phi_1$, $\phi_2$ and $\phi_3$ for three tunnel lengths for counterclockwise rotation. For clockwise rotation of tunnel 114, $\phi_2$ is the sum of $\phi_1$ and $\phi_3$. For a given tunnel length, the lag angle $\phi_3$ may be approximated by linear approximation angle $\phi_4$, which is a linear function of $\phi_1$. For example, for a tunnel length of 52 feet, lag angle $\phi_3$ may be approximated by the relationship $\phi_4 = 0.22\phi_1$. The tables also provide a comparison between the values of lag angle $\phi_3$ calculated from the skid compensation formula and values of linear approximation lag angle $\phi_4$. In one embodiment of the invention $\phi_2$ is calculated according to the skid compensation formula based on an estimated value of the length of the tunnel 1. In one embodiment, in which the tunnel length varies from 52 feet to 103 feet, lag angle $\phi_3$ may also be approximated by linear approximation lag angle $\phi_4$ for all lengths of tunnel 114 by the formula $\phi_4 = 0.14\phi_1$.

Case 1: Bridge at maximum retraction
tunnel length = 52 feet; $d_1 + d_2$ = 20 feet; linear Factor = 0.22

| $\phi_1$(deg) | $\phi_2 = \phi_1 - \phi_3$(deg) | $\phi_3$(deg) | Linear Approximation $\phi_4$(deg) (0.22 $\phi_1$) |
|---|---|---|---|
| 0 | 0.00 | 0.00 | 0.00 |
| 10 | 9.38 | 0.62 | 2.20 |
| 20 | 17.71 | 2.29 | 4.40 |
| 30 | 25.29 | 4.71 | 6.60 |
| 40 | 32.39 | 7.61 | 8.80 |
| 50 | 39.26 | 10.74 | 11.00 |
| 60 | 46.11 | 13.89 | 13.20 |
| 70 | 53.18 | 16.82 | 15.40 |
| 80 | 60.71 | 19.29 | 17.60 |
| 90 | 68.96 | 21.04 | 19.80 |

Case 2: Bridge at average service length
tunnel length = 93 feet; $d_1 + d_2$ = 20 feet; Linear Factor = 0.14

| $\phi_1$(deg) | $\phi_2 = \phi_1 - \phi_3$(deg) | $\phi_3$(deg) | Linear Approximation $\phi_4$(deg) (0.14 $\phi_1$) |
|---|---|---|---|
| 0 | 0.00 | 0.00 | 0.00 |
| 10 | 9.84 | 0.36 | 1.40 |
| 20 | 18.65 | 1.35 | 2.80 |
| 30 | 27.18 | 2.82 | 4.20 |
| 40 | 36.41 | 4.59 | 5.60 |
| 50 | 43.49 | 6.51 | 7.00 |
| 60 | 51.61 | 8.39 | 8.40 |
| 70 | 59.93 | 10.07 | 9.80 |
| 80 | 68.83 | 11.37 | 11.20 |
| 90 | 77.88 | 12.14 | 12.60 |

Case 3: With bridge at maximum extension
tunnel length = 103 feet; $d_1 + d_2$ = 20 feet; Linear Factor = 0.11

| $\phi_1$(deg) | $\phi_2 = \phi_1 - \phi_3$(deg) | $\phi_3$(deg) | Linear Approximation $\phi_4$(deg) (0.11 $\phi_1$) |
|---|---|---|---|
| 0 | 0.00 | 0.00 | 0.00 |
| 10 | 9.68 | 0.32 | 1.10 |
| 20 | 18.78 | 1.22 | 2.20 |
| 30 | 27.44 | 2.56 | 3.30 |
| 40 | 35.81 | 4.19 | 4.40 |
| 50 | 44.06 | 5.94 | 5.50 |
| 60 | 52.35 | 7.65 | 6.60 |
| 70 | 60.83 | 9.17 | 7.70 |
| 80 | 69.67 | 10.33 | 8.80 |
| 90 | 79.01 | 10.99 | 9.90 |

In addition to the above approximation, a variety of straight line or higher order approximations may be used to approximate the relationship between $\phi_1$ and $\phi_2$ provided by the skid compensation formula. Additionally, various methods may be used to measure the extended length of the bridge. For example, a location sensor 126, shown in FIG. 1, may be placed on the tunnel 114 to locate the cab, thus providing a value for the extended length of the bridge. As another example, the extended length of the bridge may be measured through various techniques that receive a signal from the steering mechanism and retains steering history.

The skid compensation formula provides one relationship between $\phi_1$ and $\phi_2$ that reduces skidding. Such a relationship, or other relationships between $\phi_1$ and $\phi_2$ may be implemented through the control system 500 shown in FIG. 5. One method of aligning wheel set 120 in a direction approximately tangent to its path is accomplished as described below. Wheel set 118 is steered in a conventional manner well known in the art. One such method is steering a joy stick 502. Joy stick 502 may produce a signal associated with a desired travel direction for use in aligning wheel set 118. In one embodiment, in order to rotate wheel set 118 about axis 220, the joy stick 502 is moved either directly left or directly right. The joy stick 502 may rotate wheel set 118 about axis 220 through an angle proportional to the length of time the joy stick 502 is pushed in a direction either directly left or directly right. Directing the joy stick 502 in a direction to the left, rotates wheel set 118 about axis 220 in a counterclockwise direction. Conversely, placement of joy stick 502 in a direction directly to the right rotates wheel set 118 about axis 220 in a clockwise direction. The joy stick 502 also operates to drive the wheel sets 118 and 120 either forward or in reverse. Placing the joy stick 502 in a direction directly forward drives the wheel sets 118 and 120 forward. The speed at which the wheel sets 118 and 120 are driven is proportional to the distance the joy stick 502 is pushed forward. By operating the joy stick 502 in this manner, wheel set 118 may be steered in any given direction desired.

In addition, wheel sets 118 and 120 may be driven in a reverse direction through pointing the joy stick 502 in a direction directly backward. Such a system is well known in the art and is only one example of a method for steering wheel set 118.

Figure 5:
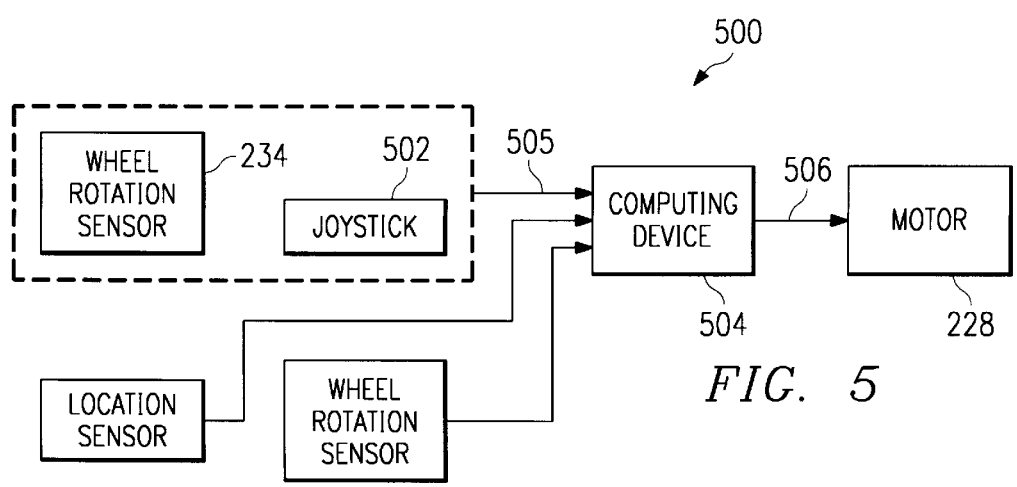
FIG. 5 is a flow chart illustrating the provision of a skid compensation angle for one wheel set according to the invention.

As illustrated in FIG. 5, when wheel set 118 is steered in a desired direction such as by steering joy stick 502, angle $\phi_1$ may be measured by a wheel rotation sensor 234. Wheel rotation sensor 234 may be of any type that is operable to sense the rotation of wheel set 118 or any of the wheels that make up wheel set 118, such as wheels 204 and 206. One example of such a wheel rotation sensor is a 360° transducer manufactured by Westlock Controls with a model number of 1065-2580131. Wheel rotation sensor 234 provides a desired travel direction 505 to a computing device 504. Computing device 504 may be any type of computing device operable to receive a signal indicative of a desired travel direction and generate a skid compensation control signal 506. One example of a suitable computing device is a programmable logic controller manufactured by Cutler Hammer and having an identification number of D200. The computing device 504 provides a skid compensation control signal 506 to motor 228. Alternatively, the computing device 504 provides skid compensation control signal 506 to any type of actuator operable to align wheel set 120 or wheels 214 and 216. Skid compensation control signal 506 is indicative of the angle $\phi_2$ that wheel set 120 should be aligned to avoid skidding. Computing device 504 may also receive a signal from wheel rotation sensor 234 for confirming the alignment of wheel set 120. In addition, computing device may receive a signal from location sensor 126, which may be used to determine an appropriate value for skid compensation control signal 506.

In one embodiment, the skid compensation control signal 506 is such that motor 230 rotates wheel set 120 to an angle $\phi_2$ that is approximately 86% of $\phi_1$ for counterclockwise rotation and 114% of $\phi_1$ for clockwise rotation. It should be understood that various other proportionality constants may be used without departing from the scope of the present invention.

In other embodiments, skid compensation control signal 506 is such that motor 228 rotates wheel set 120 to an angle $\phi_2$ that is defined by the skid compensation formula. In still other embodiments of the present invention, skid compensation control signal 506 is such that motor 228 aligns wheel set 120 at any desired direction 42 to reduce skidding, including aligning wheel set 120 in a direction exactly tangent to its path. It should be understood that although one embodiment of the invention has been described in the context of adjusting the alignment of wheel set 120 based on the direction of travel of wheel set 118, the alignment of wheel set 118 could be adjusted based on the desired direction of travel for wheel set 120.

In another embodiment of the present invention, also shown in FIG. 5, the travel direction 505 is provided by joy stick 502. Joy stick 502, which is used to steer wheel set 118 may also directly provide a signal to computing device 504 that is indicative of the alignment of wheel set 118, $\phi_1$. In this manner, $\phi_2$ can be aligned such that it is approximately or exactly tangent to the instantaneous path of wheel set 120. Various other techniques may be used to provide a signal based upon the direction of travel of wheel set 118 or cab 116 without departing from the scope of the present invention.

Although the present invention has been described in detail, it should be understood that various changes, substitutions, and alterations can be made hereto without departing from the spirit and scope of the invention as defined in the appended claims.

What is claimed is:

1. A method for reducing skidding of a passenger boarding bridge wheel, the bridge having a fixed end and a free end, the method comprising the steps of:
   receiving a travel direction of the free end;
   determining an extension length of the boarding bridge measured from the fixed end to the free end;
   providing a skid compensation control signal to an actuator in response to the travel direction and the extension length; and
   aligning by the actuator the wheel in response to the skid compensation control signal.

2. The method of claim 1 wherein the step of aligning the wheel comprises aligning the wheel in a direction approximately tangent to the direction of travel of the wheel.

3. The method of claim 1 wherein the step of receiving a travel direction comprises receiving a signal from a joystick.

4. The method of claim 1 wherein the step of receiving a travel direction comprises receiving a signal from a wheel rotation sensor.

5. The method of claim 1 wherein the step of providing a skid compensation control signal comprises:
   calculating a desired angular wheel alignment based on the travel direction and the extension length; and
   providing a skid compensation control signal based on the desired angular wheel alignment.

6. The method of claim 5 wherein the desired angular wheel alignment is approximately proportional to the travel direction.

7. The method of claim 1 wherein the step of determining an extension length comprises the step of determining the location of the wheel with respect to the fixed end.

8. The method of claim 1 wherein the step of aligning the wheel comprises aligning the wheel in a direction different from the travel direction.

9. A method for reducing skidding in a passenger boarding bridge having at least two wheels, a fixed end, and a free end, the method comprising the steps of:
   aligning a first wheel to a desired first angular position;
   providing the first angular position to a computing device;
   determining an extension length of the boarding bridge measured from the fixed end to the free end;
   providing the extension length to the computing device;
   generating from the computing device a skid compensation control signal in response to the first angular position and the extension length; and
   rotating a second wheel to a second angular position in response to the skid compensation control signal.

10. The method of claim 9 wherein the step of rotating the second wheel comprises rotating the second wheel to a direction approximately tangent to a direction of travel of the wheel.

11. The method of claim 9 wherein the second angular position is approximately proportional to the first angular position.

12. The method of claim 11 wherein the second angular position is approximately 84 percent of the first angular position for counterclockwise rotation of the passenger boarding bridge and approximately 114 percent of the first angular position for clockwise rotation of the passenger boarding bridge.

13. The method of claim 9 wherein the computing device is a programmable logic controller.

14. The method of claim 9 wherein the step of rotating a second wheel comprises actuating a motor to align the wheel.

15. A passenger boarding bridge comprising:

an extensible tunnel having a fixed end and a free end;

an extension sensor for determining an extension length of the bridge measured from the fixed end to the free end;

a plurality of wheels on the free end for moving the free end of the tunnel in a desired direction the plurality of wheels comprising a first and second wheel;

a steering mechanism for controlling the direction of movement of the free end; and a control system operable to align the first wheel in a different direction than the second wheel to reduce skidding, the control system comprising:

a computing device for generating a control signal; and an actuator for rotating at least one of the wheels in response to the control signal.

16. The passenger boarding bridge of claim 15 wherein the control system is operable to align a second wheel in a direction approximately tangent to a direction of travel of the second wheel.

17. The passenger boarding bridge of claim 15 wherein the actuator comprises a motor.

18. The passenger boarding bridge of claim 15 wherein:

the steering mechanism generates a direction signal; and the computing device generates the control signal in response to the direction signal and the extension length.

19. The passenger boarding bridge of claim 15 and further comprising:

a sensor for measuring the alignment of at last one of the wheels and for generating an alignment signal; and wherein the computing device generates the control signal in response to the alignment signal and the extension length.

20. A method for reducing skidding in an extensible passenger boarding bridge wheel, the boarding bridge having a free end and a fixed end, the method comprising:

receiving a travel direction for the free end of the boarding bridge;

extending or retracting the free end of the boarding bridge in the travel direction;

recording a steering history of the free end as the boarding bridge extends or retracts;

determining a distance from the fixed end to the free end using the steering history;

calculating a desired angular wheel alignment based on the travel direction and the distance from the fixed end to the free end of the boarding bridge;

providing a skid compensation control signal to an actuator based on the desired angular wheel alignment; and aligning, by the actuator, the wheel in response to the skid compensation control signal.

\* \* \* \* \*